US008147091B2

(12) United States Patent
Hsia et al.

(10) Patent No.: US 8,147,091 B2

(45) Date of Patent: Apr. 3, 2012

(54) LINEAR SOLID-STATE LIGHTING WITH SHOCK PROTECTION SWITCHES

(75) Inventors: Chungho Hsia, San Jose, CA (US); Pai-Sheng Shen, Bellevue, WA (US); Ching-Feng Lin, Taipei (TW)

(73) Assignee: Lightel Technologies Inc., Renton, WA (US)

( * ) Notice: Subject to any disclaimer, the term of this patent is extended or adjusted under 35 U.S.C. 154(b) by 370 days.

(21) Appl. No.: 12/645,390

(22) Filed: Dec. 22, 2009

(65) Prior Publication Data

US 2011/0149563 A1 Jun. 23, 2011

(51) Int. Cl.
*F21S 4/00* (2006.01)
*H02H 11/00* (2006.01)

(52) U.S. Cl. ........ 362/221; 362/218; 362/225; 362/394; 362/249.02; 362/390

(58) Field of Classification Search ............. 362/217.01, 362/218, 221, 225, 249.02, 390, 394
See application file for complete search history.

(56) References Cited

U.S. PATENT DOCUMENTS

| | | | | |
|---|---|---|---|---|
| 5,844,759 | A * | 12/1998 | Hirsh et al. | 361/42 |
| 7,476,004 | B2 * | 1/2009 | Chan | 362/240 |
| 7,976,185 | B2 * | 7/2011 | Uang et al. | 362/240 |
| 2010/0033095 | A1 * | 2/2010 | Sadwick | 315/51 |
| 2011/0149564 | A1 * | 6/2011 | Hsia et al. | 362/221 |

* cited by examiner

*Primary Examiner* — Stephen F Husar
*Assistant Examiner* — James Cranson, Jr.
(74) *Attorney, Agent, or Firm* — Pai Patent & Trademark Law Firm; Chao-Chang David Pai

(57) ABSTRACT

A linear light-emitting diode (LED)-based solid-state device comprising at least two shock protection switches, at least one each at the two ends of the device, fully protects a person from possible electric shock during re-lamping with LED lamps.

18 Claims, 8 Drawing Sheets

LINEAR SOLID-STATE LIGHTING WITH SHOCK PROTECTION SWITCHES

BACKGROUND OF THE INVENTION

1. Field of the Invention

This invention relates to linear light-emitting diode (LED) lamps and more particularly to a linear LED lamp with two shock protection switches, one at each of two ends of the lamp.

2. Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock, overheating, and fire become especially important and need to be well addressed.

LEDs have a long operating life of 50,000 hours. This is equivalent to 17 years of service period, assuming operating eight hours per day, every day. However, several factors may affect the operating life of an LED-based lamp. High operating temperature is most detrimental to both LEDs and the LED driver that powers the LEDs. While LEDs can operate 50,000 hours under a condition of good thermal management such as when using an efficient heat sink design, the lamp will not emit light when LED driver is broken, which happens if high-temperature air accumulates around the LED driver, and any of its electronic components fails. In spite of longevity of LEDs, the LED-based linear lighting system can operate only around 25,000 hours. Some issues related to system reliability during service life of an LED-based lighting system need also to be discussed.

In retrofit application of a linear LED tube (LLT) lamp to replace an existing fluorescent tube, one must remove the starter or ballast because the LLT lamp does not need a high voltage to ionize the gases inside the gas-filled fluorescent tube before sustaining continuous lighting. LLT lamps operating at AC mains, such as 110, 220, and 277 VAC, have one construction issue related to product safety and needed to be resolved prior to wide field deployment. This kind of LLT lamps always fails a safety test, which measures through lamp leakage current. Because the line and the neutral of the AC main apply to both opposite ends of the tube when connected, the measurement of current leakage from one end to the other consistently results in a substantial current flow, which may present risk of shock during re-lamping. Due to this potential shock risk to the person who replaces LLT lamps in an existing fluorescent tube fixture, Underwriters Laboratories (UL), use its standard, UL 935, Risk of Shock During Relamping (Through Lamp), to do the current leakage test and to determine if LLT lamps under test meet the consumer safety requirement.

Appliances such as toasters and other appliances with exposed heating filaments present this kind of hazard. When the line and the neutral wire reverse, the heating filaments can remain live even though the power switches to “off”. Another example is screw-in incandescent bulbs. With the line and the neutral wire reversed, the screw-in thread of the socket remains energized. These happen when the line and the neutral wires in the wiring behind the walls or in the hookup of sockets are somehow interchanged even with polarized sockets and plugs that design for safety. The reason why a consumer can widely use the appliances with heating filaments and screw-in light lamps without worrying about shock hazards is that they have some kinds of protections. The said appliances have protection grids to prevent consumers from touching the heating filaments even when they are cool. The screw-in light lamp receptacle has its two electrical contacts, the line and the neutral in proximity, recessed in the luminaire. When one screws an incandescent bulb in the receptacle, little shock risk exists.

As mentioned, without protection, shock hazard will occur for an LLT lamp, which is at least 2 feet long; it is very difficult for a person to insert the two opposite bi-pins at the two ends of the LLT lamp into the two opposite sockets at two sides of the fixture at the same time. Because protecting consumers from possible electric shock during re-lamping is a high priority for LLT lamp manufacturers, they need to provide a basic protection design strictly meeting the minimum leakage current requirement and to prevent any possible electric shock that users may encounter in actual usage, no matter how they instruct a consumer to install an LLT lamp in their installation instructions.

An easy solution to reducing the risk of shock is to connect electrically only one of two bi-pins at the two ends of an LLT lamp to AC mains, leaving the other dummy bi-pin at the other end of the LLT lamp insulated. In such a way, the line and the neutral of the AC main go into the LLT lamp through the bi-pin, one for the line and the other for the neutral. The electrically insulated dummy bi-pin at the other end only serves as lamp holder to support LLT lamp mechanically in the fixture. In this case, however, the retrofit of the existing fixture to enable LLT lamp becomes complicated and needs much longer time to complete, even for electrical professionals. The rewiring and installation costs will be too high for LLT lamp providers to replace conventional fluorescent tubes economically.

Referring to FIG. 1 and FIG. 2, a conventional LLT lamp 100 without protection switches comprises a plastic housing 110 with a length much greater than its radius of 30 to 32 mm, two end caps 120 and 130 each with a bi-pin on two opposite ends of the plastic housing 110, LED arrays 140 and 141 mounted on two PCBs 150 and 151, electrically connected in series using a connector 145, and an LED driver 160 used to generate a proper DC voltage and provide a proper current from the AC main and to supply to the LED arrays 140 and 141 such that the LEDs 170 and 171 on the two PCBs 150 and 151 can emit light. In some conventional LLT lamps, DIP (dual in-line package) rather than SMD (surface mount device) LEDs are used as lighting sources. Although SMD LEDs and the supporting PCB allow more efficient manufacturing, higher yield, higher lumen output and efficacy, and longer life than their DIP counterparts do, some LLT lamp providers still produce such DIP-based products. The two PCBs 150 and 151 are glued on a surface of the lamp using an adhesive with its normal parallel to the illumination direction. The bi-pins 180 and 190 on the two end caps 120 and 130 connect electrically to an AC main, either 110 V, 220 V, or 277 VAC through two electrical sockets located lengthways in an existing fluorescent tube fixture. The two sockets in the fixture connect electrically to the line and the neutral wire of the AC main, respectively. In some conventional LLT lamps, the LED driver wrapped by an insulation paper is inserted into the LLT lamp without being mechanically secured. Another drawback for this rough manufacturing process is poor heat dispersion, which may cause overheating over a certain period under high ambient-temperature operation and shorten the LED driver's life and the lamp's life as a whole due to poor air convection and heat accumulation inside the LLT lamp 100. In another conventional model, the circuitry of the LED driver 160 mixes with the LED arrays 140 on the PCB 150. Based on this configuration, there are two LED drivers: driver-1 160 and driver-2 161 as shown in FIG. 2. The drawback for this is that no sufficient number of LEDs is on the LED PCB, thus affecting lumen output and efficacy of the lamp. Another conventional type of LLT lamps uses two or more LED PCBs connected electrically in series. By using hard wires, the connections may not be reliable enough. Furthermore, the LED PCBs in some conventional LLT lamps are glued on the platform using adhesives, which may present another reliability issue because the PCB may peel off from the platform under adverse operating environments such as high temperature and high humidity. This is critical when the LED lamp is expected to service for 17 years.

To replace a fluorescent tube with an LLT lamp 100, one inserts the bi-pin 180 at one end of the LLT lamp 100 into one of the two electrical sockets in the fixture and then inserts the other bi-pin 190 at the other end of the LLT lamp 100 into the other electrical socket in the fixture. When the line power of the AC main applies to the bi-pin 180 through a socket, and the other bi-pin 190 at the other end is not in the socket, the LLT lamp 100 and the LED driver 160 are deactivated because no current flows through the LED driver 160 to the neutral. However, the internal electronic circuitry is still live. At this time, if the person who replaces the LLT lamp 100 touches the exposed bi-pin 190, which is energized, he or she will get electric shock because the current flows to earth through his or her body—a shock hazard.

Almost all LLT lamps currently available on the market are without any protection for such electric shock. The probability of getting shock is 50%, depending whether the person who replaces the lamp inserts the bi-pin first to the line of the AC main or not. If he or she inserts the bi-pin 180 or 190 first to the neutral of the AC main, then the LLT lamp 100 is deactivated while the internal circuitry is not live—no shock hazard.

An LLT lamp supplier may want to use only one shock protection switch at one end of an LLT lamp in an attempt to reduce the risk of shock during re-lamping. However, the one-switch approach cannot eliminate the possibility of shock risk. As long as shock risk exists, the consumer product safety remains the most important issue.

SUMMARY OF THE INVENTION

The present invention uses shock protection switches at both ends of the LLT lamp, at least one at each end, to fully protect the person from possible electric shock during re-lamping.

A linear light-emitting diode (LED)-based solid-state device comprising a heat sink, an LED driver, an LED printed circuit board (PCB) with a plurality of LEDs, a lens, and at least two shock protection switches, is used to replace a fluorescent tube in an existing fixture. With these shock-protection switches—at least one each at the two ends of the device, the LLT lamp prevents electric shock from happening during re-lamping. The two shock-protection switches with actuation mechanisms are engaged separately to connect the line and neutral of an external AC main to two inputs of the LED driver used to power LEDs in the LLT lamp. In such a scheme, no line voltage will possibly appear at the exposed bi-pin during re-lamping and thus any leakage current will be eliminated.

Modular design can increase manufacturing efficiency and improve yields. In this aspect, the present invention has a housing, which is preferably metallic in material and forms a hollow space lengthways under a platform. In the hollow space, the LED driver is inserted. On top of the platform, the LED PCB with a plurality of surface mount or DIP LEDs and a lens along the length are mounted. With two protection switches connected to the bi-pins through a lamp base assembly on both ends of the housing and the two inputs of the LED driver, the device can safely replace a fluorescent tube in an existing fixture. With a proper AC main connected, the device can emit warm white, natural white, day white, or cool white light corresponding to correlated color temperatures of 2,700~3,200 K, 4,000~4,500 K, 5,500~6,000 K, 7,000~7,500 K, depending on the LEDs used. Various combinations of various white, red, green, and blue LEDs are possible for implementing these correlated color temperatures.

In the present invention, thermal management not only for LEDs but also for LED driver and mechanical security of LED PCB, lamp bases, and the driver enclosure are implemented in such a way that the LLT lighting system is robust enough to maintain longevity.

DETAILED DESCRIPTION OF THE INVENTION

To protect consumers from possible electric shock during re-lamping, the present invention provides two special lamp bases, one for each end of the LLT lamp. Each lamp base contains a standard bi-pin and at least one shock protection switch, both mounted on a lamp base PCB, rather than on an end cover. This structure is different from that of the conventional LLT lamp, which uses two end caps in which the bi-pins are directly mounted.

Figure 1:
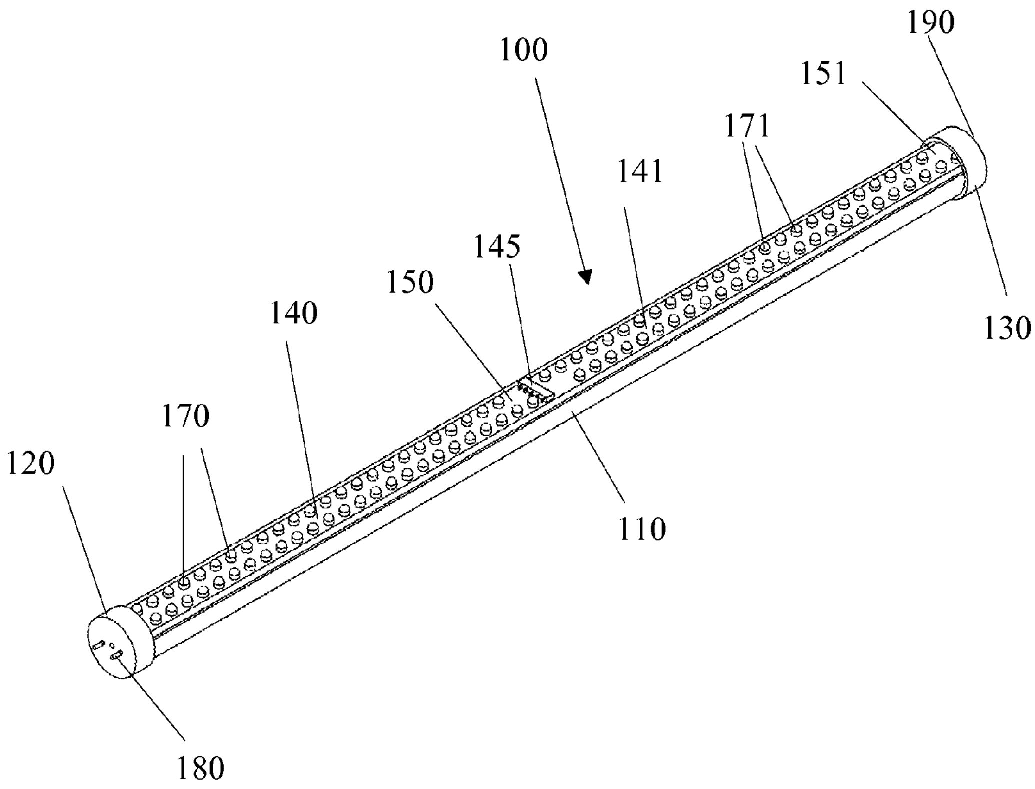
FIG. 1 PRIOR ART
FIG. 1 is an illustration of a conventional LLT lamp without shock protection switches.
Figure 2:
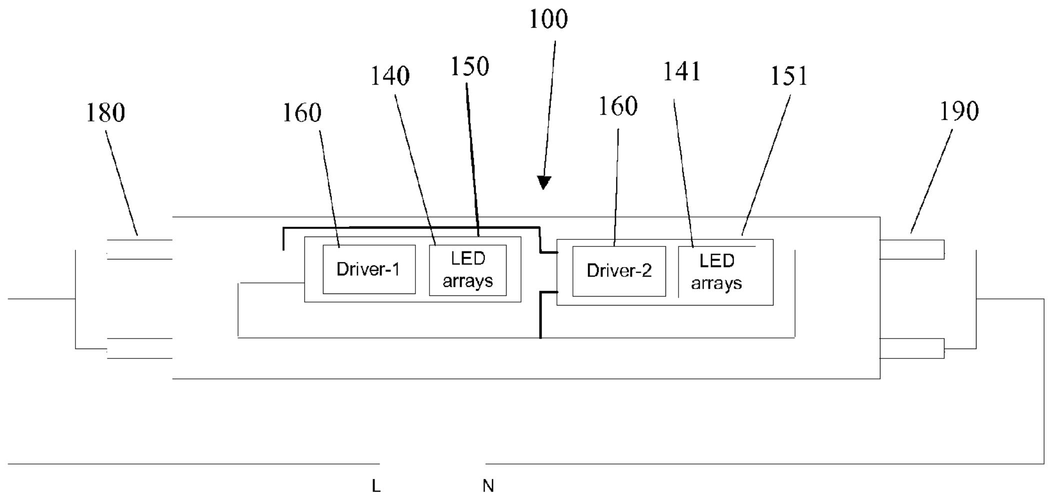
FIG. 2 PRIOR ART
FIG. 2 is a block diagram of a conventional LLT lamp with two LED drivers.
Figure 3:
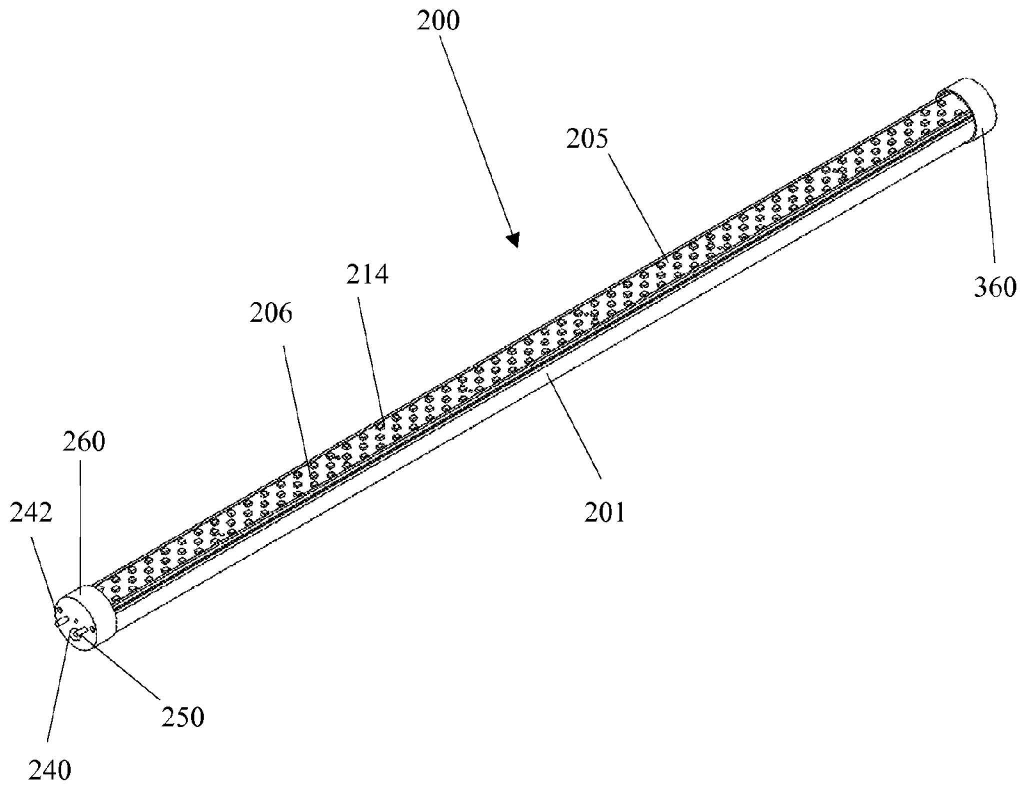
FIG. 3 is an illustration of an LLT lamp with shock protection switches according to the present invention.
Figure 4:
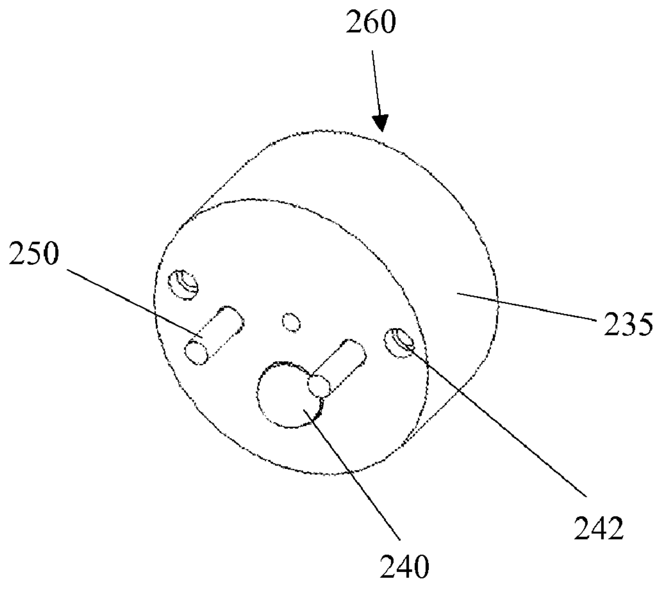
FIG. 4 is an illustration of a lamp base with a shock protection switch in place according to the present invention.
Figure 5:
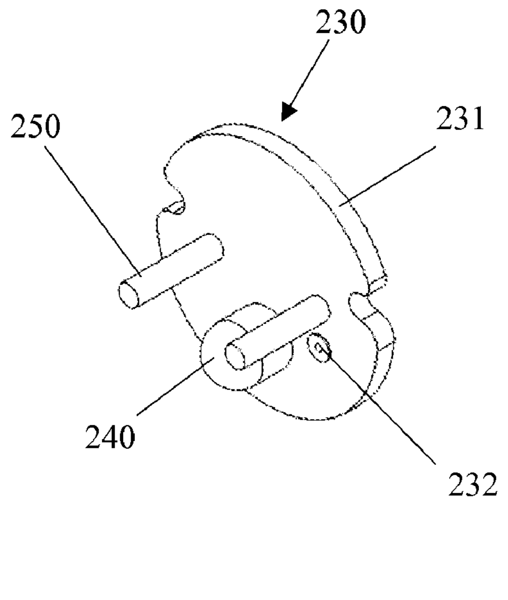
FIG. 5 is an illustration of a lamp base PCB assembly for the LLT lamp according to the present invention.
Figure 6:
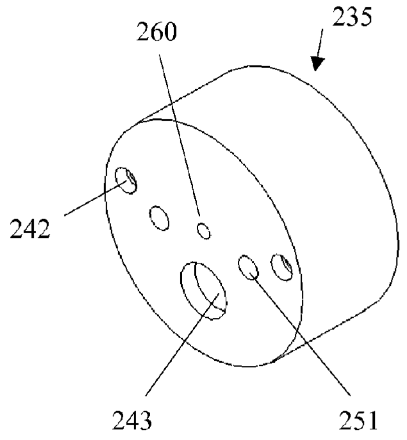
FIG. 6 is an illustration of an end cover for the LLT lamp according to the present invention.

FIG. 3 is an illustration of an LLT lamp according to the present invention. The LLT lamp 200 has a housing 201, two lamp bases 260 and 360, one at each end of the housing 201, two shock protection switches 210 and 310 in the two lamp bases 260 and 360, and an LED driver 400. The housing 201, preferably metallic in material, serves also as a heat sink with a toothed profile to increase the heat dispersion (see FIG. 9). Other types of projections can be formed on the outer surface of the housing for improved heat dispersion. On the top of the housing 201 is single-piece LED PCB 205 to support surface mount LEDs 206 arranged in arrays 214. FIG. 4 is an illustration of the lamp base 260, which comprises a lamp base PCB assembly 230 (FIG. 5) and an end cover 235 (FIG. 6). Similarly, a lamp base 360 comprises a lamp base PCB assembly 330 and an end cover 335 (not shown). In FIG. 5, the lamp base PCB assembly 230 further comprises a standard bi-pin 250 and at least one shock protection switch 210, mounted on a PCB 231. The PCB 231 has etched conductors in two layers. One layer is used to connect between the two pins of the bi-pin 250. The other one is used to connect one of the two electrical contacts of the protection switch to the bi-pin 250 through the soldering point 232 using a wire connection. FIG. 6 is an illustration of the end cover 235 used to hold and fix the lamp base PCB assembly 230 on an end of the LLT lamp 200. When fixed on the housing 201 through two counter-bore screw holes 242, the bi-pin 250 and the switch actuation mechanism 240 will protrude from the holes 251 and 243, respectively. The lamp base 260 uses the bi-pin 250 to connect the AC mains to the LED driver 400 through the protection switch 210, normally in "off" state. When pressed, the actuation mechanism 240 actuates the switch 210 and turns on the connection between the AC mains and the LED driver 400. The lamp base 360 and the protection switch 310 have a similar structure and function in a similar manner and will not be repeated here. Although a metallic housing 201 is preferred for more effectively dispersing heat, the present invention is not limited to one having a metallic housing. Namely, the LLT lamp in the present invention may have a non-metallic housing or have no housing at all.

Figure 7:
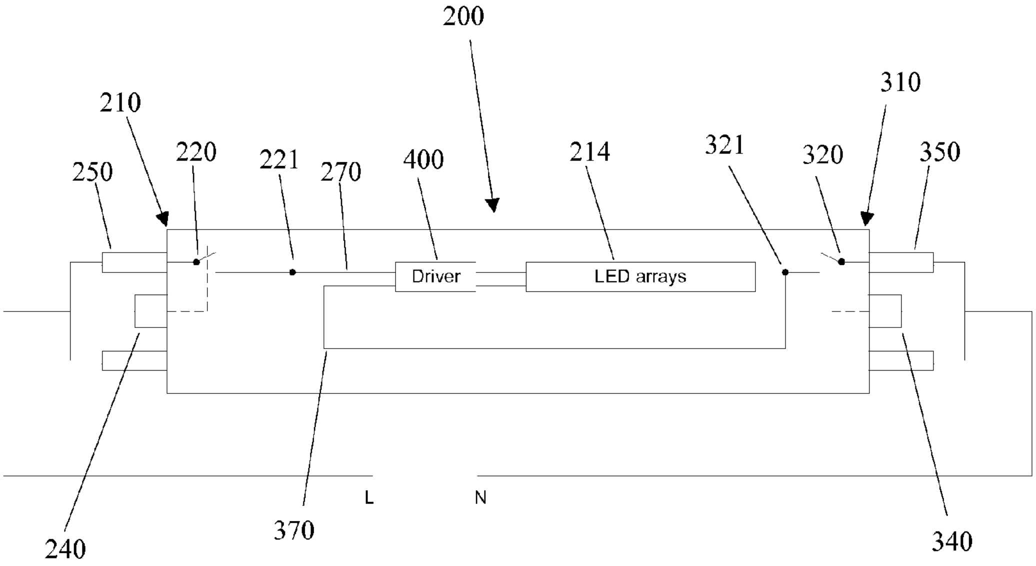
FIG. 7 is a block diagram of an LLT lamp with shock protection switches in the present invention.
Figure 8:
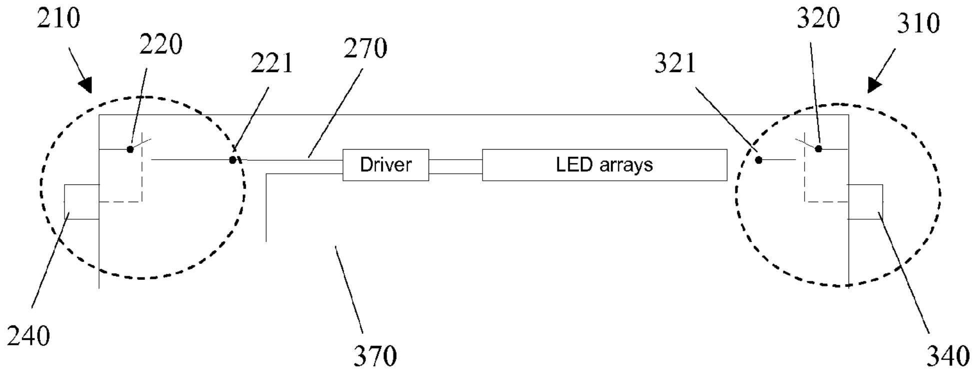
FIG. 8 is a block diagram of two shock protection switches used in the present invention.

FIG. 7 is a block diagram of an LLT lamp 200 with protection switches 210/310 in the present invention. As shown, the LED driver 400 and the LED arrays 214 are individual modules. The modular design allows LLT lamps 200 to be produced more effectively while more numbers of LEDs 206 can be surface-mounted in the LED PCB 205 area that electronic components of the LED driver may otherwise occupy. The lamp using this design can provide a sufficiently high lumen output, thus improving the system efficacy required by Energy Star program. FIG. 8 is a block diagram of two shock protection switches used in the present invention. The shock protection switch 210 comprises two electrical contacts 220 and 221 and one actuation mechanism 240. Similarly, a shock protection switch 310 comprises two electrical contacts 320 and 321 and one actuation mechanism 340.

The shock protection switch 400 can be of a contact type (such as a snap switch, a push-button switch, or a micro switch) or of a non-contact type (such as electro-mechanical, magnetic, optical, electro-optic, fiber-optic, infrared, or wireless based). The proximity control or sensing range of the non-contact type protection switch is normally up to 8 mm.

Figure 9:
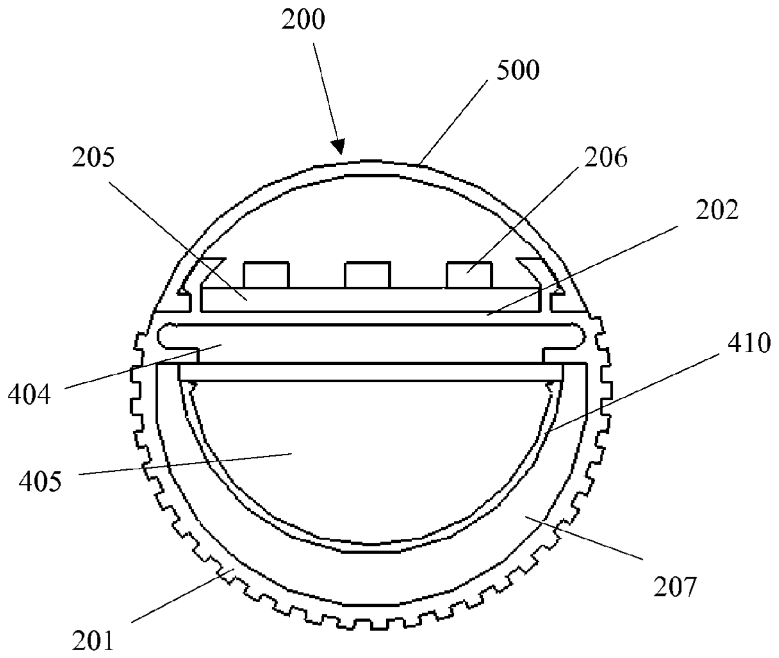
FIG. 9 is a cross-sectional view of the LLT lamp when the LED driver, the lamp base, and associated shock protection switches are omitted.

FIG. 9 is a cross-sectional view of the LLT lamp 200 when the LED driver 400 and the lamp bases 260/360 and associated protection switches 210/310 are omitted. As shown, the housing 201 provides a platform 202 to hold an LED PCB 205 on top with a plurality of surface mount LEDs 206. The housing 201 also provides a hollow space 207 under the platform 202, which can accommodate a driver enclosure 410 that support the LED driver 400 physically. The housing 201 also serves as a heat sink with a toothed profile to increase the heat dispersion for LED PCB 205 and the LED driver 400, preventing overheating. The driver enclosure 410 is mounted and secured in the hollow space 207 such that a heat dispersion channel 404 is formed between the platform 202 and the top of the driver enclosure 410 to help disperse the heat created by the LED driver 400.

Referring to FIGS. 3 to 9, one of the contacts 220 connects electrically to the bi-pin 250 in the lamp base 260 that connects to AC mains, and the other contact 221 connects to one of the inputs 270 of the LED driver 400. One of the contacts 320 connects electrically to the bi-pin 350 in the lamp base 360 that connects to AC mains, and the other contact 321 connects to the other input 370 of the LED driver 400. The switch is normally off. Only after actuated, will the switch turn "on" such that it connects the AC mains to the LED driver 400 that in turn powers the LED arrays 214. Served as gate controllers between the AC mains and the LED driver 400, the protection switch 210 and 310 connect the line and the neutral of the AC mains to the two inputs 270 and 370 of the driver 400, respectively. The protection switch may have direct actuation or sensing mechanism that actuates the switch function.

If only one shock protection switch 210 is used at one lamp base 260 for one end of the LLT lamp 200, and if the bi-pin 250 of this end happens to be first inserted into the live socket at one end of the fixture, then a shock hazard occurs because the shock protection switch 210 already allows the AC power to connect to the driver 400 electrically inside the LLT lamp when the bi-pin 250 is in the socket. Although the LLT lamp 200 is deactivated at the time, the LED driver 400 is live. Without the shock protection switch 310 at the other end of the LLT lamp 200, the driver input 370 connects directly to the bi-pin 350 at the other end of the LLT lamp 200. This presents a shock hazard. However, if the shock protection switch 310 is used as in accordance with this application, the current flow to the earth continues to be interrupted until the bi-pin 350 is inserted into the other socket, and the protection switch 310 is actuated. The switch redundancy eliminates the possibility of shock hazard for a person who installs an LLT lamp in the existing fluorescent tube fixture.

One-switch approach employed in an LLT lamp can reduce the probability of shock hazard by 50% in comparison with the LLT lamp without any shock protection switch. The present invention uses at least two protection switches, at least one at each end of an LLT lamp. It can reduce the probability of shock hazard to zero—no risk of electric shock at all, even when the power is "on". With this invention implemented in an LLT lamp, a consumer can replace a fluorescent tube with the LLT lamp without having to worry about any shock hazard that may otherwise occur.

Figure 10:
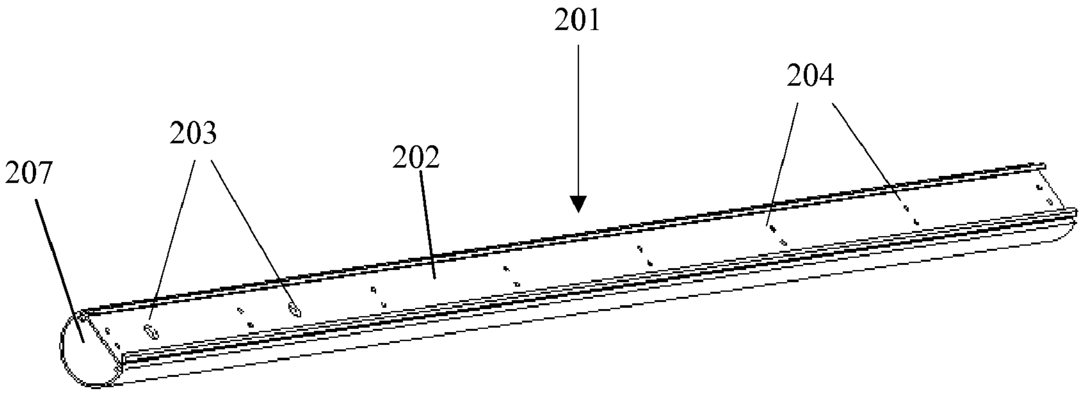
FIG. 10 is an illustration of a housing with a platform used to hold an LED PCB on one side.

FIG. 10 is an illustration of a housing 201 used to hold an LED PCB 205 on top of the platform 202 and a driver enclosure 410 in the hollow space 207 under the platform 202. Both the LED PCB 205 and the driver enclosure 410 are mechanically secured on the opposite sides of the platform 202 by using screws or rivets, through the tap holes 204 and the screw holes 203 on the platform 202, respectively. This ensures that the LED and the driver modules will not become loose from their original positions during shipment when drastic vibrations and mechanical shocks may occur.

Figure 11:
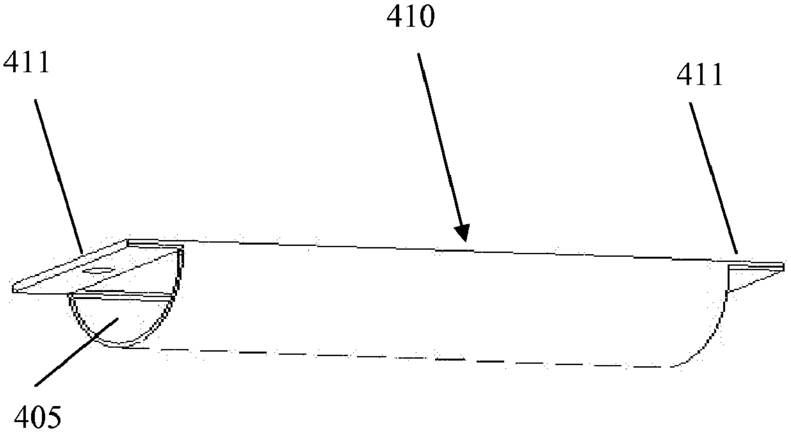
FIG. 11 is an illustration of a driver enclosure for holding the LED driver.

FIG. 11 is an illustration of a driver enclosure 410 used to hold the LED driver 400 (shown in FIG. 7) in the hollow space 405. The tap or rivet holes 411 on the two flanges, corresponding to the screw holes 203 on the platform 202, are used to secure the driver enclosure mechanically in place.

Figure 12:
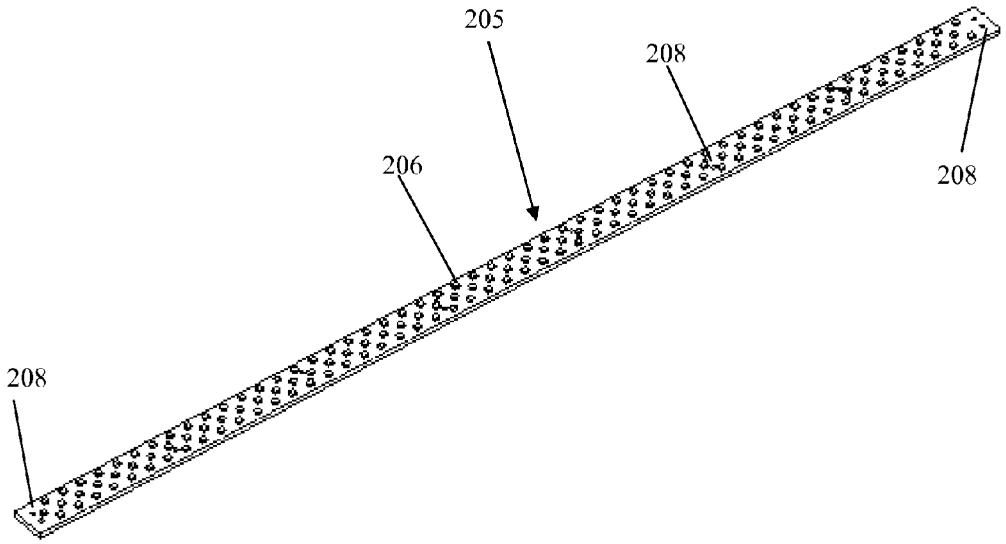
FIG. 12 is an illustration of a single-piece LED PCB, having a plurality of LEDs arranged in arrays.

FIG. 12 is an illustration of a single-piece LED PCB 205, having a plurality of SMD LEDs 206 connected in arrays and screw holes 208 for mechanical fixing of the LEDs 206. In contrast to conventional LLT lamps using two or more PCBs connected in series, the present invention using a single-piece LED PCB to accommodate hundreds of LEDs has the advantage of enhanced reliability.

Figure 13:
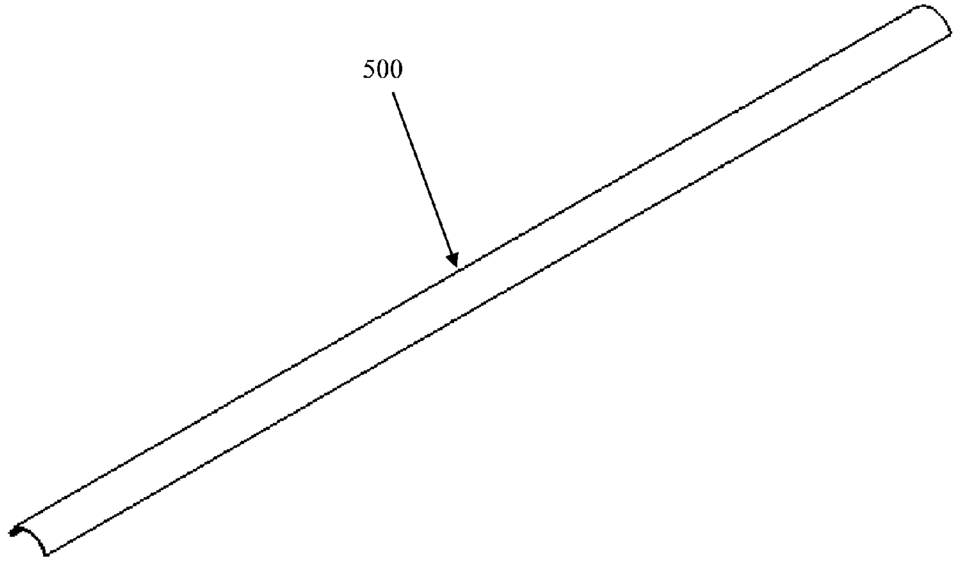
FIG. 13 is an illustration of a lens, made of plastic or other insulation materials.

FIG. 13 is an illustration of a lens 500 along the length of the LLT lamp, with a radius the same as the housing 201. The lens 500 is used not only for regulating the illumination angle but also for protecting the LEDs 206 from dust and accidental damage.

In the present invention, three main modules, the end covers 235 and 335 in the two lamp bases 260 and 360, the driver enclosure 410, and the lens 500, use plastic or other insulating materials meeting standard, UL94-V1 rating. The plastic or other insulating materials for these modules must be flame-retarded. Moreover, the LLT lamps are not limited to any particular shapes, although a circular LLT lamp has been used to illustrate the present invention.

Furthermore, the linear LED tube lamp may include various combinations of white, red, green, and blue LEDs for implementing various warm white, natural white, day white, or cool white light at correlated color temperatures of 2,700~3,200 K, 4,000~4,500 K, 5,500~6,000 K, 7,000~7,500 K.

What is claimed is:

1. A linear light-emitting diode (LED) tube lamp, comprising:

a housing having two ends and a platform on a top side thereof between the two ends;

a light-emitting diode printed circuit board (LED PCB) fixed on top of the platform, the LED PCB having a plurality of LEDs fixed thereon;

an LED driver that powers the plurality of LEDs on the LED PCB, the LED driver having two inputs and fixed inside the housing below the platform; and two lamp bases respectively connected to the two ends of the housing, each lamp base having an end cover and a lamp base PCB assembly comprising a bi-pin with two pins protruding outwards through the end cover, a lamp base PCB, and a shock protection switch mounted on the lamp base PCB, wherein: when the shock protection switch is off, the bi-pin is not electrically connected with the LED driver; when the bi-pin is inserted into a lamp socket, the shock protection switch is actuated to electrically connect the bi-pin with one of the inputs of the LED driver.

2. The linear LED tube lamp of claim 1, wherein the shock protection switch of each of the lamp bases comprises:

at least two electrical contacts, one electrically connected to the bi-pin of the lamp base and the other electrically connected to one of the inputs of the LED driver; and at least one switch actuation mechanism having a front portion protruding outwards through the end cover of the lamp base, wherein when the front portion of the switch actuation mechanism is pressed in by inserting the bi-pin of the lamp base into a lamp socket, the two electrical contacts are electrically connected to actuate the shock protection switch so that the bi-pin is electrically connected with one of the inputs of the LED driver.

3. The linear LED tube lamp of claim 1, wherein the LEDs include white, red, green, blue LEDs or a combination thereof.

4. The linear LED tube lamp of claim 1, wherein the LED driver is enclosed in a driver enclosure fixed inside the housing below the platform.

5. The linear LED tube lamp of claim 1, wherein the shock protection switch is of a contact type.

6. The linear LED tube lamp of claim 5, wherein the shock protection switch is a snap switch, a push-button switch, or a micro switch.

7. The linear LED tube lamp of claim 1, wherein the shock protection switch is of a non-contact type.

8. The linear LED tube lamp of claim 7, wherein the shock protection switch is electro-mechanical, magnetic, optical, electro-optic, fiber-optic, infrared, or wireless based.

9. The linear LED tube lamp of claim 8, wherein the shock protection switch has a proximity control or sensing range up to 8 mm.

10. The linear LED tube lamp of claim 1, wherein the end cover is fixed to the associated lamp base PCB assembly by screws.

11. The linear LED tube lamp of claim 1, wherein the LED PCB is fixed to the platform by screws or rivets.

12. The linear LED tube lamp of claim 1, wherein the LEDs are surface mount device (SMD) LEDs or dual in-line package (DIP) LEDs.

13. The linear LED tube lamp of claim 1, further comprising a lens covering the LED PCB and the LEDs.

14. The linear LED tube lamp of claim 1, wherein a plurality of projections are formed on an outer surface of the housing for improved heat dispersion.

15. The linear LED tube lamp of claim 1, wherein the housing has a cross section with a circumference composed of a circular curve and a chord, the chord corresponding to the platform of the housing.

16. The linear LED tube lamp of claim 15, wherein a plurality of projections are formed on an outer surface of the housing for improved heat dispersion.

17. The linear LED tube lamp of claim 15, further comprising a lens covering the LED PCB and the LEDS, wherein the lens and the housing have a combined cross section with a full-circle circumference.

18. The linear LED tube lamp of claim 1, wherein the housing is made of a metallic material.

* * * * *